United States Patent
Strelow et al.

(10) Patent No.: US 8,959,128 B1
(45) Date of Patent: Feb. 17, 2015

(54) GENERAL AND NESTED WIBERG MINIMIZATION

(75) Inventors: Dennis Strelow, San Jose, CA (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 449 days.

(21) Appl. No.: 13/297,709

(22) Filed: Nov. 16, 2011

(51) Int. Cl.
*G06F 7/38* (2006.01)

(52) U.S. Cl.
USPC .......................................... 708/200; 708/446

(58) Field of Classification Search
CPC .......... G06F 17/11; G06F 17/13; G06F 17/17
USPC .................. 708/200, 207, 443, 446
See application file for complete search history.

(56) References Cited

U.S. PATENT DOCUMENTS 6,009,437 A * 12/1999 Jacobs ................................. 1/1
6,212,485 B1 * 4/2001 Nakano et al. .................... 703/5

OTHER PUBLICATIONS

Okatani et al., "Efficient Algorithm for Low-rank Matrix Factorization with Missing Components and Performance Comparison of Latest Algorithms", IEEE, 2011.*
Eriksson et al., "Efficient Computation of Robust Low-Rank Matrix Approximations in the Presence of Missing Data using the L1 Norm," School of Computer Science, University of Adelaide. Computer Vision and Pattern Recognition, IEEE (2010).
Strelow et al., "General and Nested Wiberg Minimization," Computer Vision and Pattern Recognition, IEEE (2012).

* cited by examiner

*Primary Examiner* — Chuong D Ngo
(74) *Attorney, Agent, or Firm* — Fish & Richardson P.C.

(57) ABSTRACT

Wiberg minimization operates on a system with two sets of variables described by a linear function and in which some data or observations are missing. The disclosure generalizes Wiberg minimization, solving for a function that is nonlinear in both sets of variables, U and V, iteratively. In one embodiment, defining a first function $f(U,V)$ that may be defined that may be nonlinear in both a first set of variables U and a second set of variables V. A first function $f(U,V)$ may be transformed into $f(U, V(U))$. First assumed values of the first set of variables U may be assigned. The second set of variables V may be iteratively estimated based upon the transformed first function $f(U, V(U))$ and the assumed values of the first set of variables U such that $f(U, V(U))$ may be minimized with respect to V. New estimates of the first set of variables U may be iteratively computed.

11 Claims, 13 Drawing Sheets

GENERAL AND NESTED WIBERG MINIMIZATION

BACKGROUND

Known Wiberg minimization minimizes a function of two sets of variables, which is linear in at least one of the sets of variables. Examples of a function to be minimized include (1) the $L_1$ norm of a vector function; (2) the $L_2$ norm of a vector function; and (3) the negative likelihood of a set of observations. The disclosure generalizes Wiberg minimization to functions that are nonlinear in both sets of variables.

Wiberg demonstrated an $L_2$ factorization method for matrices with missing data that solved for one set of variables V in terms of the other set of variables U. It linearizes V about U and then minimizes with respect to U only. Subsequent work showed Wiberg's method had better convergence than using Levenberg-Marquardt to minimize with respect to U and V simultaneously. It has also been shown that Wiberg's approach may be adapted for $L_1$ matrix factorization using linear programming. This method outperformed an alternating convex programming method for $L_1$ factorization, establishing a new state-of-the-art technique for solving that type of problem.

Wiberg's $L_2$ method is an application of more general work on separable nonlinear minimization that uses the idea of solving for V in terms of U and then minimizing with respect to U only. A high-level approach to minimizing a general function in this manner has been described where V breaks down into small independent problems given U. But this approach focused on the specific case of nonlinear least squares, where the objective is linear in V. A separable method for maximum likelihood estimation for a nonlinear least squares problem linear in V has also been previously described. The Wiberg approach contrasts with methods that simply alternate between determining one set of unknowns while holding the other fixed. While these alternating methods can sometimes converge well, they can also fail to converge catastrophically and do not converge quadratically like second-order methods that minimize with respect to all of the variables simultaneously.

The Wiberg approach to matrix factorization breaks a matrix Y into low-rank factors U and V by solving for V given U in closed form, linearizing V(U) about U, and iteratively minimizing $\|Y-UV(U)\|_2$ with respect to U only. The Wiberg approach optimizes the same objective while effectively removing V from the minimization, that is, Wiberg minimizes a function with respect to one set of variables only. Recently, this approach has been extended to $L_1$, minimizing $\|Y-UV(U)\|_1$. This $L_1$-Wiberg approach outperformed the previous state-of-the-art for $L_1$ factorization.

BRIEF SUMMARY

One embodiment of the disclosed subject matter can comprise defining a first function $f(U, V)$ that may be nonlinear in both a first set of variables U and a second set of variables V. The first function $f(U, V)$ may be transformed into $f(U, V(U))$ such that the members of the first set of variables U may be independent variables and the members of the second set of variables V may be dependent on the first set of variables. First, assumed values of the first set of variables U may be assigned. The second set of variables V may be iteratively estimated based upon the transformed first function $f(U, V(U))$ and the assumed values of the first set of variables U such that $f(U, V(U))$ may be minimized with respect to V. New estimates of the first set of variables U may be iteratively computed to minimize the transformed first function $f(U, V(U))$ based upon the assumed values of the first set of variables U, the calculated values of the second set of variables V, a derivative of the second set of variables V with respect to the first set of variables U, and a total derivative of the transformed first function $f(U, V(U))$ with respect to the members of the first set of variables U. The derivative may be computed using finite differences, analytically, or both using finite differences and analytically. In addition, a nested minimization may be performed on any number of variables. A set of variables $U_1, \ldots, U_n$ may be defined. The first function $f(U, V)$ may be transformed into $f(U_1, V(U_1)), (U_2, V(U_1)), \ldots, f(U_n, V(U_{n-1})), (U_{n+1}, V(U_n))$ and minimized with respect to $U_n$. The total derivative of the transformed first function may also be computed automatically such that the nesting may be performed with respect to n sets of variables.

The minimizing of the transformed first function $f(U, V(U))$ based upon the assumed values of the first set of variables U may comprise minimizing $L_1$ error, minimizing $L_2$ error, or a maximum likelihood estimation. The $L_1$ error may be minimized using successive linear programming. The $L_2$ error may be minimized using the Gauss-Newton method. The maximum likelihood estimation may be determined by the Newton-Raphson method. For each iteration, a different subset of U may be selected and the transformed first function $f(U, V(U))$ may be minimized with respect to the selected subset of the variables. A subset of U may be selected to be a smallest subset of U that creates a solvable subproblem.

This method may be further extended to perform a nested minimization. A second set of variables V may be defined in terms of a third set of variables D and a second function $f(V, D)$ to be minimized may be defined that is nonlinear in both a second set of variables V and the third set of variables D. The second function $f(V, D)$ may be transformed into $f(V, D(V))$ such that the members of the second set of variables V may be independent variables and the members of the third set of variables D may be dependent on the second set of variables V and that the first function is now represented by $f(U, V(U), D(V, U))$. Second assumed values of the second set of variables V may be assigned. The third set of variables D may be iteratively estimated based upon the transformed second function $f(V, D(V))$ and the second assumed values of the second set of variables V, such that $f(V, D(V))$ may be minimized with respect to D. New estimates of the second set of variables V may be iteratively computed to minimize the transformed second function $f(V, D(V))$ based upon the assumed values of the second set of variables V and the calculated values of the third set of variables D and a derivative of the third set of variables D with respect to the second set of variables V, and a total derivative of the transformed second function $f(V, D(V))$ with respect to the members of the second set of variables V. New estimates of the first set of variables U may be iteratively computed to maximize the transformed first function $f(U, V(U), D(V, U))$ based upon the assumed values of the first set of variables U and the calculated values of the second set of variables V and the calculated values of the third set of variables D, the derivative of D with respect to V, the derivative of D with respect to U, and the derivative of V with respect to U, and the total derivative of the transformed first function $f(U, V(U), D(V, U))$ with respect to the first set of variables U.

A plurality of images may be received from a camera. The plurality of images may comprise a sequence. One or more two-dimensional features may be identified in each of a plurality of images in the received sequence of images. A three-dimensional point associated with each of the identified one or more two-dimensional features may be estimated. Each of the one or more two-dimensional features may be tracked through successive images of the plurality of images. A two-dimensional image error may be iteratively minimized between the tracked each of the one or more two-dimensional features and an image reprojection with respect to the three-dimensional point corresponding to the one or more two-dimensional features and a three-dimensional position of the camera corresponding to one or more of the plurality of images. The camera may have no known features or at least one known feature. Examples of features may include focal length, image center, and radial distortion. The determination of the camera's position may be performed using general Wiberg minimization or nested Wiberg minimization in accordance with embodiments of the subject matter disclosed herein. An $L_1$ norm of the image error may be minimized with respect to each of the at least one known feature simultaneously using successive linear programming. An $L_1$ norm of the image error may be minimized with respect to each of the one or more unknowns simultaneously using successive linear programming.

In another embodiment of the disclosed subject matter, a set of observations may be received. The observations may comprise at least one known observation and at least one unknown observation. A first low rank factor U and a second low rank factor V may be defined. An expression that describes the set of observations using low-rank factorization with respect to the first low rank factor U and the second low rank factor V may be minimized. This minimization may generate an error. The error generated by the minimizing of the expression may be minimized by minimizing each of the at least one unknown observation with respect to U and V simultaneously using successive linear programming. An estimate may be obtained of each of the at least one unknown observation based upon the step of minimizing the error.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

One embodiment of the disclosed subject matter generalizes the Wiberg approach beyond factorization to minimize an arbitrary nonlinear function of two sets of variables $f(U, V)$. This approach allows Wiberg minimization to be used for $L_1$ minimization, $L_2$ minimization, or maximum likelihood estimation.

The general method disclosed herein operates by solving for V iteratively rather than in closed form. In another embodiment of the disclosed subject matter, V can itself be split into two sets of variables found using Wiberg minimization because it is found iteratively. This embodiment of the disclosed subject matter results in a nested Wiberg minimization that can effectively minimize with respect to three sets of variables. Theoretically, n sets of variables may be minimized with more elaborate nesting, where n is a positive integer. This concept is discussed in detail below on $L_1$ projective structure-from-motion, where the three sets of unknowns are camera projection matrices, three-dimensional point positions, and projective depths. The approximate camera position may be determined by performing a nested Wiberg minimization. Also described below is a simplified presentation of $L_1$-Wiberg factorization and a successive linear programming method for $L_1$ factorization that explicitly updates all of the unknowns simultaneously. The successive linear programming baseline outperforms $L_1$-Wiberg for most large inputs, establishing a new state-of-the-art for those cases. Comparisons with alternating methods were excluded in favor of stronger baselines that minimize with respect to all of the variables simultaneously.

Figure 1:
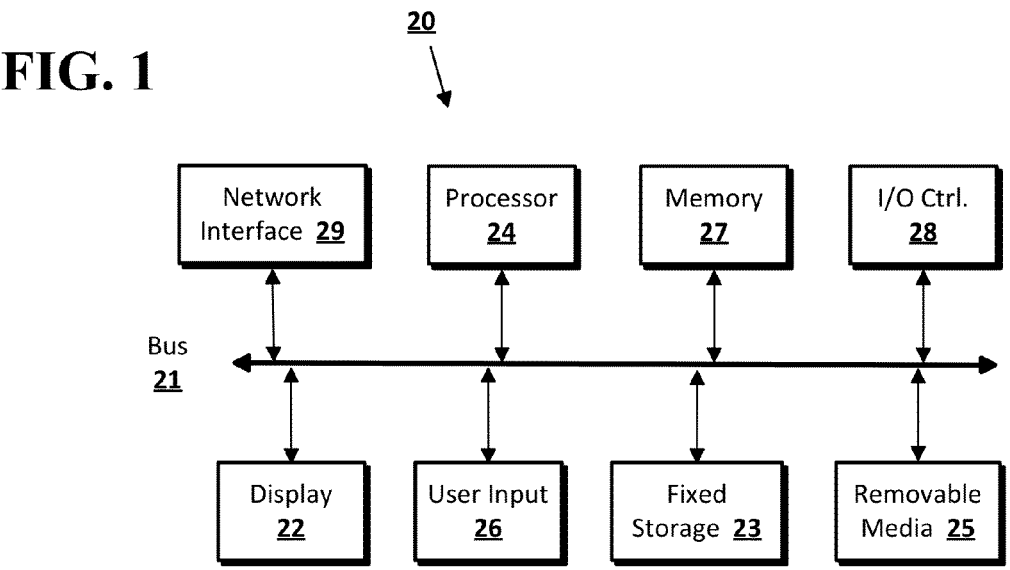
FIG. 1 shows a computer according to an embodiment of the disclosed subject matter.

Embodiments of the presently disclosed subject matter may be implemented in and used with a variety of component and network architectures. FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
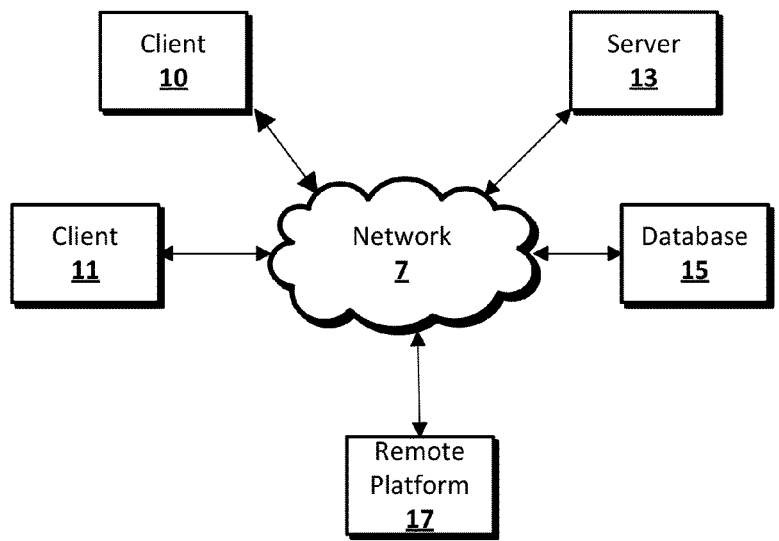
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15.

The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

One embodiment of the disclosed subject matter is an improvement of previous methods of $L_1$-Wiberg factorization, wherein solving for the columns of V separately may be performed rather than solving for V as a whole.

Linear programming solves the problem:

$$\min_x c^T x, \ \ni Ax \leq b, x \geq 0 \qquad \text{(Equation 1)}$$

where x represents the vector of variables to be determined, c and b are vectors of known coefficients, and A is a known matrix of coefficients. As written here, the objective function ($c^T x$) is minimized. $Ax \leq b$ and $x \geq 0$ are the constraints over which the objective function is to be minimized. The problem may be solved using the simplex method. The "slack form" used by the simplex method converts the inequalities $Ax \leq b$ to equalities by introducing nonnegative slack variables s such that:

$$\min_{x} c^T x, \ni [A\ I][x; s] = b, x \geq 0, s \geq 0 \quad \text{(Equation 2)}$$

The optimal solution [x; s] will include basic components $x_B$, which can be nonzero; and nonbasic components $x_N$, which will be zero. The columns of [A I] corresponding to $x_B$ are the "basis" B and $Bx_B = b$. Then since $x_B = B^{-1}b$, it can be shown that:

$$\frac{dx_B}{dB} = -x_B^T \otimes B^{-1} \quad \text{(Equation 3)}$$

$$\frac{dx_B}{db} = B^{-1} \quad \text{(Equation 4)}$$

where $\otimes$ is the Kronecker product. By inserting zero derivatives corresponding to elements of the nonbasic components and dropping derivatives of the slack variables, these derivatives to dx/dA and dx/db.

The $L_1$ residual of an overdetermined linear system may be minimized using linear programming. This may be represented by:

$$\min_{y} \|d - Cy\|_1 \quad \text{(Equation 5)}$$

Since the linear programming problem (Equation 1) requires $x \geq 0$, y may be split into the difference of two non-negative terms, $y = y^+ - y^-$. Then, letting $t_i$ be the $L_1$ residual of individual row i of d–Cy:

$$t_i = |d_i - C_i(y^+ - y^-)| \quad \text{(Equation 6)}$$

Converting Equation 6 to two inequalities results in:

$$C_i(y^+ - y^-) - t_i \leq d_i \quad \text{(Equation 7)}$$

$$-C_i(y^+ - y^-) - t_i \leq -d_i \quad \text{(Equation 8)}$$

The optimal $y^+$, $y^-$, $t_i$ can be found with the linear program:

$$\min_{y^+, y^-, t} [0\ 0\ 1^T] \begin{bmatrix} y^+ \\ y^- \\ t \end{bmatrix} \quad \text{(Equation 9)}$$

and $$\begin{bmatrix} C & -C & -I \\ -C & C & -I \end{bmatrix} \begin{bmatrix} y^+ \\ y^- \\ t \end{bmatrix} \leq \begin{bmatrix} d \\ -d \end{bmatrix} \quad \text{(Equation 10)}$$

The objective in Equation 9 minimizes the sum of the individual $L_1$ errors. The derivative of $[y^+\ y^-\ t]$ with respect to the coefficient matrix and right-hand side of Equation 10 may be obtained as described above. Since y is a simple function of $y^+$, $y^-$ and the coefficient matrix and right-hand-side are simple functions of C, d, dy/dC and dy/dd may be derived with some simple algebra and rearranging.

The $L_1$ norm of a nonlinear function may be minimized using the linear minimization described earlier iteratively. For example, supposing errors between predictions $f(x)$ and observations y:

$$\text{error}(x) = y - f(x) \quad \text{(Equation 11)}$$

and minimization of the following is desired:

$$\min_{x} \|\text{error}(x)\|_1 \quad \text{(Equation 12)}$$

Given an estimate x, a new estimate $x + \delta_x$ my be computed with:

$$\min_{\delta_x} \left\| \text{error}(x) - \frac{df(x)}{dx} \delta_x \right\|_1 \quad \text{(Equation 13)}$$

and this may be repeated until convergence. Equation 13 represents a linear $L_1$ minimization and can be solved as described in Equation 5.

The step will often increase rather than decrease the objective, preventing convergence, because the $\delta_x$ that minimizes Equation 13 may be outside the region where the linearization $df(x)/dx$ is accurate. An adaptive trust region helps ensure convergence by limiting the step to a finite region near the current estimate, and adaptively determining what the size of that region should be. The trust region's role is similar to the adaptive damping factor $\lambda$ that Levenberg-Marquardt adds to Gauss-Newton.

To limit the step size $\|\delta_x\|_1$ in Equation 13 to some trust region size $\mu$, Equation 10 may be augmented to:

$$\begin{bmatrix} C & -C & -I \\ -C & C & -I \\ I & I & 0 \end{bmatrix} \begin{bmatrix} y^+ \\ y^- \\ t \end{bmatrix} \leq \begin{bmatrix} d \\ -d \\ \mu \end{bmatrix} \quad \text{(Equation 14)}$$

$\mu$ may be adapted to a useful step size around the current estimate. If the most recent $\delta_x$ decreases the objective, $\mu$ may be increased to $10\mu$ assuming that the best trust region is no smaller than the current $\mu$. If $\delta_x$ does not decrease the objective, then $\delta_x$ is outside the region where the linearization is valid. $\mu$ may be decreased to $\|\delta_x\|_1/10$ and the objective may be recomputed.

Figure 3:
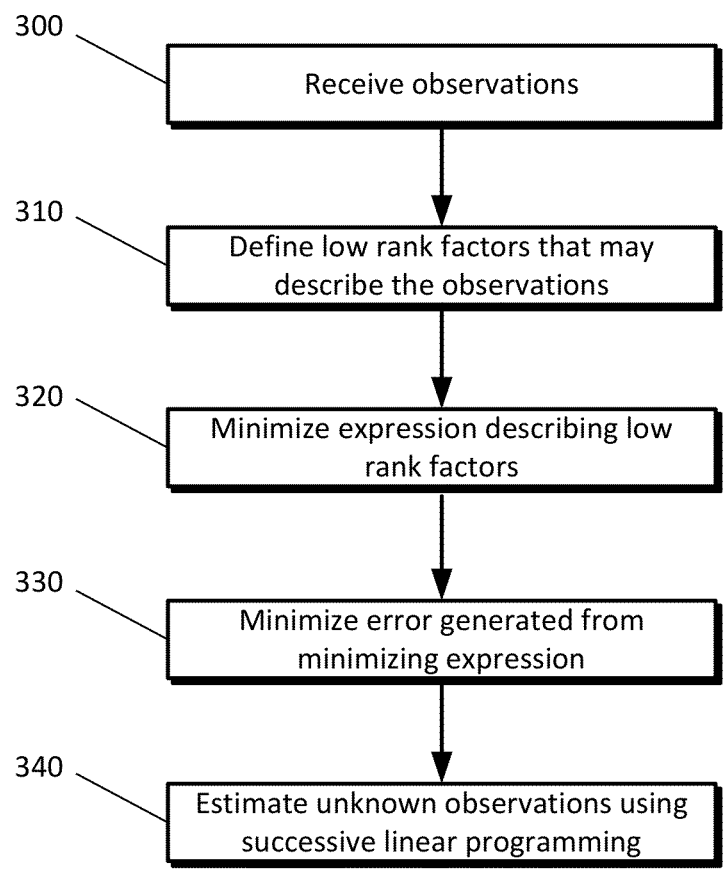
FIG. 3 shows an example process for $L_1$ matrix factorization according to an embodiment of the disclosed subject matter.

FIG. 3 shows another embodiment of the disclosed subject matter, an $L_1$ matrix factorization method. At 300, a set of observations may be received. The observations may comprise at least one known observation and at least one unknown observation. For example, if a matrix can be used to describe the numbers of flight reservations from source cities to destination cites, with each row of the matrix representing a source city and each column of the matrix representing a destination city. Some of the values in matrix may be received ("known observations"), e.g., there are 43 reservations for a flight between Washington, D.C. and San Francisco Calif. Other values in the matrix may not be received ("unknown observations") e.g., the number of reservations from Charleston, S.C. to Rochester, N.Y. may be unknown or unavailable. A first low rank factor U and a second low rank factor V may be defined at 310. An expression that describes the set of observations using low-rank factorization with respect to the first low rank factor U and the second low rank factor V may be minimized at 320. At 330 this minimization may generate an error which may be reduced by minimizing each of the at least one unknown observation with respect to U and V simultaneously using successive linear programming. An estimate may be obtained of each of the at least one unknown observation at 340 based upon the step of minimizing the error. A more technical description of this method is now provided.

Supposing an observation matrix Y with observations $Y_{r_1,c_1}, Y_{r_2,c_2}, \ldots, Y_{r_k,c_k}$ present and other observations are missing. Then, low-rank matrix factorization minimizes:

$$\|[Y_{r_1,c_1} \ldots Y_{r_k,c_k}]^T - [u_{r_1}v_{c_1} \ldots u_{r_k}v_{c_k}]^T\|_1 \quad \text{(Equation 15)}$$

with respect to low-rank factors U and V, where $u_r$ is the $r^{th}$ row of U and $v_c$ is the $c^{th}$ column of V. Eriksson et al. showed that Wiberg's approach could be used to minimize Equation 15 by combining the linear and nonlinear $L_1$ minimizations for a single set of variables.

Low-rank factor U may be fixed and $v_c$ of V may be solved for at each column by minimizing $$\|[Y_{r_{i_1},c} \ldots Y_{r_{i_n},c}]^T - [u_{r_{i_1}}; \ldots ; u_{r_{i_n}}]v_c\|_1 \quad \text{(Equation 16)}$$

with respect to $v_c$. This is a linear minimization, meaning $v_c$ and $dv_c/dU$ can be found as described earlier.

Then, Equation 15 may be rewritten as a function of U only:

$$\|[Y_{r_1,c_1} \ldots Y_{r_k,c_k}]^T - [u_{r_1}v_{c_1}(U) \ldots u_{r_k}v_{c_k}(U)]^T\|_1 \quad \text{(Equation 17)}$$

and it may be minimized with respect to U by computing the steps described in Equation 13. To perform this calculation, the errors $y - f(x)$ are required; these errors are the vector described by Equation 17 and the derivative of the predictions with respect to U. In this case, the individual predictions are $u_{r_i}v_{c_i}(U)$ and their derivatives are:

$$\frac{du_{r_i}v_{c_i}(U)}{dU} = \frac{\partial u_{r_i}v_{c_i}(U)}{\partial U} + \frac{\partial u_{r_i}v_{c_i}(U)}{\partial v_{c_i}}\frac{dv_{c_i}}{dU} \quad \text{(Equation 18)}$$

where $$\frac{\partial u_{r_i}v_{c_i}(U)}{\partial u_{r_i}} = v_{c_i}^T \quad \text{(Equation 19)}$$

and the partial derivative with respect to other components of U is zero; and $$\frac{\partial u_{r_i}v_{c_i}(U)}{\partial v_{c_i}} = u_{r_i} \quad \text{(Equation 20)}$$

Solving for the $v_c$ independently produces the same results as solving for all of V in one linear program while greatly simplifying the method.

For $L_1$ factorization, minimization may be performed with respect to U and V simultaneously using the successive linear programming method described above. This approach converges approximately as well as the Wiberg approach and is much faster than the Wiberg method for most large problems.

The Wiberg approach effectively removes the unknowns V from the iterative minimization. However, $L_1$ Wiberg has two speed disadvantages. First, the $L_1$ errors $t_i$ for each individual observation are added as an explicit unknown in the linear programming problem, and the number of unknowns in V we remove can be insignificant compared to the number of $t_i$'s. Second, the Wiberg derivative matrix (Equation 18) can be more dense than the simultaneous derivative matrix (Equations 21, 22), which slows the simplex solve.

This simultaneous method has the same objective (Equation 15) and error function as the Wiberg approach. The derivatives of the predictions with respect to U and V are required for the update step (Equation 13). The derivatives of the prediction $u_{r_i}v_{c_i}$ with respect to $u_{r_i}$ and $v_{c_i}$ are:

$$\frac{du_{r_i}v_{c_i}}{du_{r_i}} = v_{c_i}^T \quad \text{(Equation 21)}$$

and $$\frac{du_{r_i}v_{c_i}}{dv_{c_i}} = u_{r_i} \quad \text{(Equation 22)}$$

The other derivatives are zero.

One embodiment of the disclosed subject matter is a general Wiberg minimization applied to arbitrary nonlinear functions of two set of variables. As an example of this idea, $L_1$ bundle adjustment may be implemented as a general Wiberg minimization.

Turning now to general Wiberg minimization, $L_1$-Wiberg factorization solves for V and its derivative with respect to U using the closed-form linear minimization (Equation 2), but solves for U using the iterative nonlinear minimization (Equation 3). Adapting the Wiberg method to minimize a nonlinear function of U is possible as long as the function is linear in V. But many functions are nonlinear in two sets of variables. In bundle adjustment, for instance, the objective function is a sum of reprojection errors, which are nonlinear in both the three-dimensional point positions and the six-degree-of-freedom camera positions.

Figure 4:
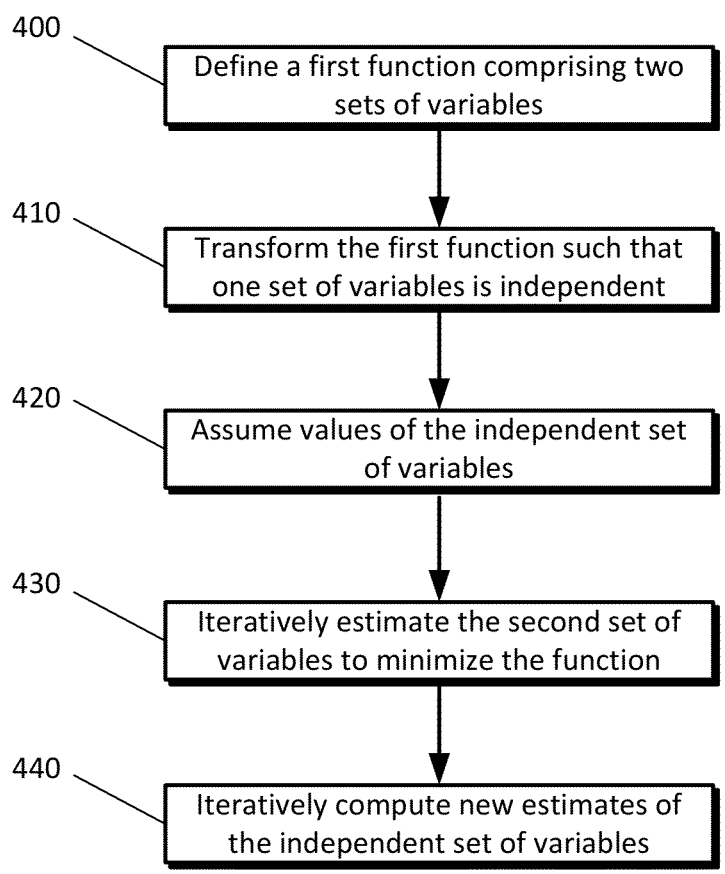
FIG. 4 shows an example process for general Wiberg minimization according to an embodiment of the disclosed subject matter.

In one embodiment of the disclosed subject matter shown in FIG. 4, general Wiberg minimization may comprise defining a first function $f(U, V)$ that may be nonlinear in both a first set of variables U and a second set of variables V at 400. The first function $f(U, V)$ may be transformed into $f(U, V(U))$ at 410 such that the members of the first set of variables U may be independent variables and the members of the second set of variables V may be dependent on the first set of variables. At 420, first assumed values of the first set of variables U may be assigned. The second set of variables V may be iteratively estimated at 430 based upon the transformed first function $f(U, V(U))$ and the assumed values of the first set of variables U such that $f(U, V(U))$ may be minimized with respect to V. New estimates of the first set of variables U may be iteratively computed to minimize the transformed first function $f(U, V(U))$ based upon the assumed values of the first set of variables U, the calculated values of the second set of variables V, a derivative of the second set of variables V with respect to the first set of variables U, and a total derivative of the transformed first function $f(U, V(U))$ with respect to the members of the first set of variables U at 440. The derivative may be computed using finite differences. That is, the derivatives are estimated by incrementing the independent variable, observing the resulting difference in the dependent variable, and using the ratio of dependent to independent variable change as an estimate of the derivative. The derivative may also be found analytically.

The minimizing of the transformed first function $f(U, V(U))$ based upon the assumed values of the first set of variables U may comprise minimizing $L_1$ error, minimizing $L_2$ error, or a maximum likelihood estimation. The $L_1$ error may be minimized using successive linear programming. The $L_2$ error may be minimized using the Gauss-Newton method. The maximum likelihood estimation may be determined by the Newton-Raphson method. For each iteration, a different subset of U may be selected and the transformed first function $f(U, V(U))$ may be minimized with respect to the selected subset of the variables. A subset of U may be selected to be a smallest subset of U that creates a solvable subproblem. In addition, a nested minimization may be performed on any number of variables. For example, a set of variables $U_1, \ldots, U_n$ may be defined. The first function $f(U, V)$ may be transformed into $f(U_1, V(U_1)), (U_2, V(U_1)), \ldots, f(U_n, V(U_{n-1})), (U_{n+1}, V(U_n))$ and minimized with respect to $U_n$. The total derivative of the transformed first function may also be computed automatically such that the nesting may be performed with respect to n sets of variables.

More specifically, an iterative minimization for V as well as U may be employed. With this approach, there is an outer loop that minimizes with respect to U and within each U iteration there is an inner loop that minimizes with respect to V. This method may be applied to bundle adjustment and factorization problems where given U, V breaks down into independent subproblems $v_c$. In this case the time for iteratively solving for the $v_c$ is small because each $v_c$ is much smaller than U.

To determine $dv_c/dU$ if $v_c$ was found iteratively, $v_c$ may be solved for by substituting $v_c$ for x in the equation described in Equation 13. The final estimate for $v_c$ is $v_c^{previous}+\delta_{v_c}$ for some constant $v_c^{previous}$. The derivative of $v_c$ with respect to U is the derivative of $\delta_{v_c}$:

$$\frac{dv_c}{dU} = \frac{d\delta_{v_c}}{dU} \quad \text{(Equation 23)}$$

$$= \frac{d\delta_{v_c}}{d(dp(v_c)/dv_c)} \frac{d(dp(v_c)/dv_c)}{dU} \quad \text{(Equation 24)}$$

$$+ \frac{d\delta_{v_c}}{d\text{error}(v_c)} \frac{d\text{error}(v_c)}{dU} \quad \text{(Equation 25)}$$

The derivatives of error $(v_c)$ and $dp(v_c)/dv_c$ with respect to U depend on the specific function that is being minimized.

The derivatives of the predictions with respect to U may be computed by generalizing Equation 18 to:

$$\frac{dp(U)}{dU} = \frac{\partial p(U)}{\partial U} + \frac{\partial p(V)}{\partial V}\frac{dV}{dU} \quad \text{(Equation 26)}$$

Minimization may now be performed with respect to U by substituting this derivative for $df(x)/dx$ in Equation 13.

If the inner iterations for $v_c$ converge, the final steps $\delta_{v_c}$ will be zero. This means that in the linear programming solution for $\delta_{v_c}$ the simplex method can exclude elements of $\delta_{v_c}$ from the basis, and its derivatives with respect to U will be zero according to the methods described earlier concerning linear programming and linear $L_1$ minimization. In this case, the method degenerates to an expectation-maximization-like method in which the $v_c$'s are effectively fixed during the U update. Expectation-maximization solves for two sets of unknowns alternately. It solves for each set of unknowns while holding the other constant.

To ensure that $v_c$ will be included in the basis, instead of substituting error($v_c$) and $dp(v_c)/dv_c$ for error (x) and $df(x)/dx$ directly in Equation 13:

$$\min_{\delta_{v_c}} \left\| \text{error}(v_c) - \frac{dp(v_c)}{dv_c}\delta_{v_c} \right\|_1 \quad \text{(Equation 27)}$$

the disclosed subject matter may solve for $\delta_{v_c}' = \delta_{v_c} + \epsilon$, $\epsilon = [10^{-6} \ldots 10^{-6}]$ in:

$$\min_{\delta'_{v_c}} \left\| \left( \text{error}(v_c) - \frac{dp(v_c)}{dv_c}\epsilon \right) - \frac{dp(v_c)}{dv_c}\delta'_{v_c} \right\|_1 \quad \text{(Equation 28)}$$

$\delta_{v_c}'$ will be $\epsilon$ at convergence and included in the basis since it is nonzero. $\delta_{v_c} = \delta_{v_c}' - \epsilon$ may be determined and derivatives of $\delta_{v_c}$ to be those of $\delta_{v_c}'$ may be taken. This method allows for including $v_c$ in the basis, although those skilled in the art will recognize that other approaches may be possible.

As described earlier, a trust region can be used to prevent divergence of the successive linear programming iteration. In the general Wiberg method disclosed herein, both the outer and inner iterations are successive linear programming and the trust region can be used to prevent divergence in both cases.

Figure 5:
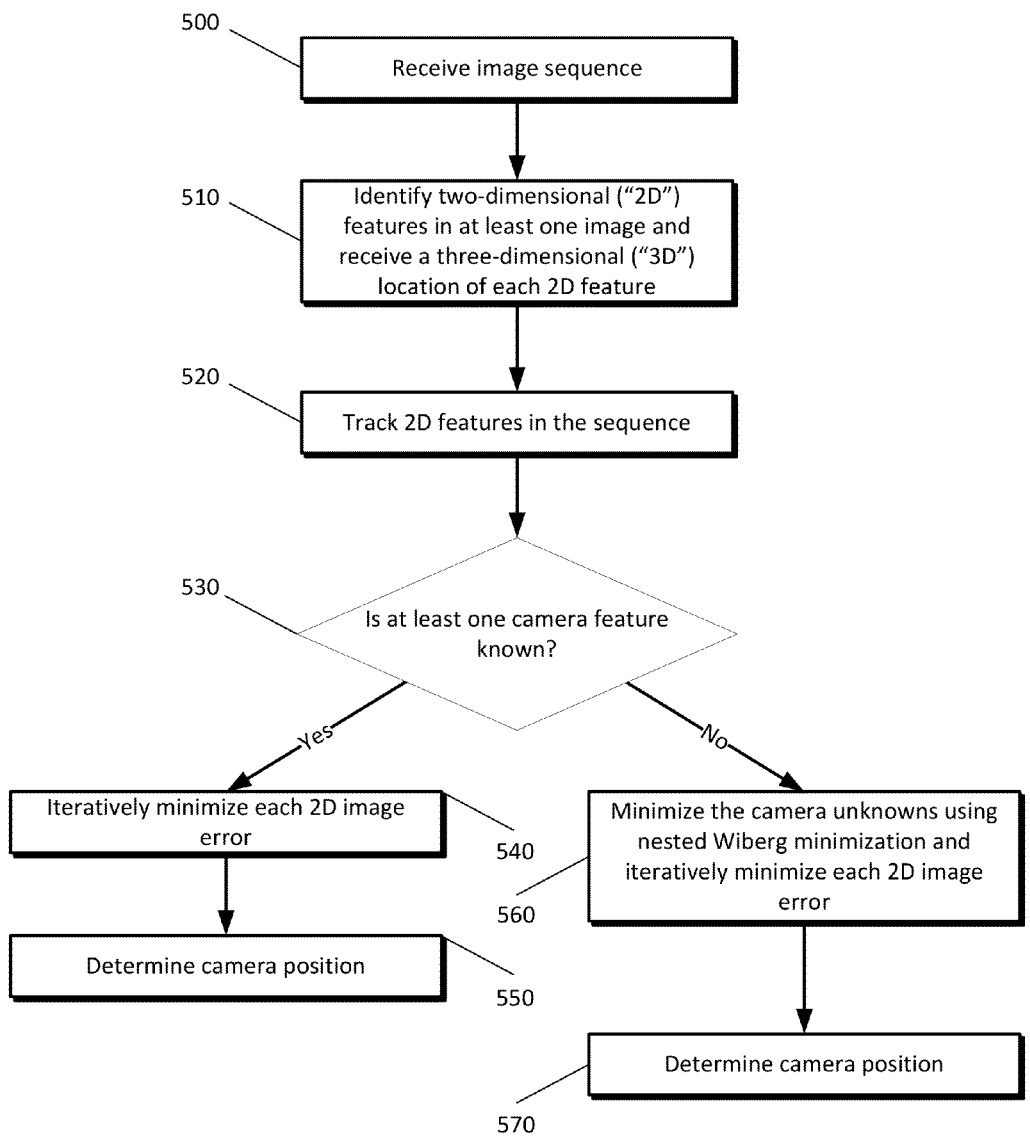
FIG. 5 shows an example process for $L_1$-Wiberg bundle adjustment according to an embodiment of the disclosed subject matter.
Figure 6:
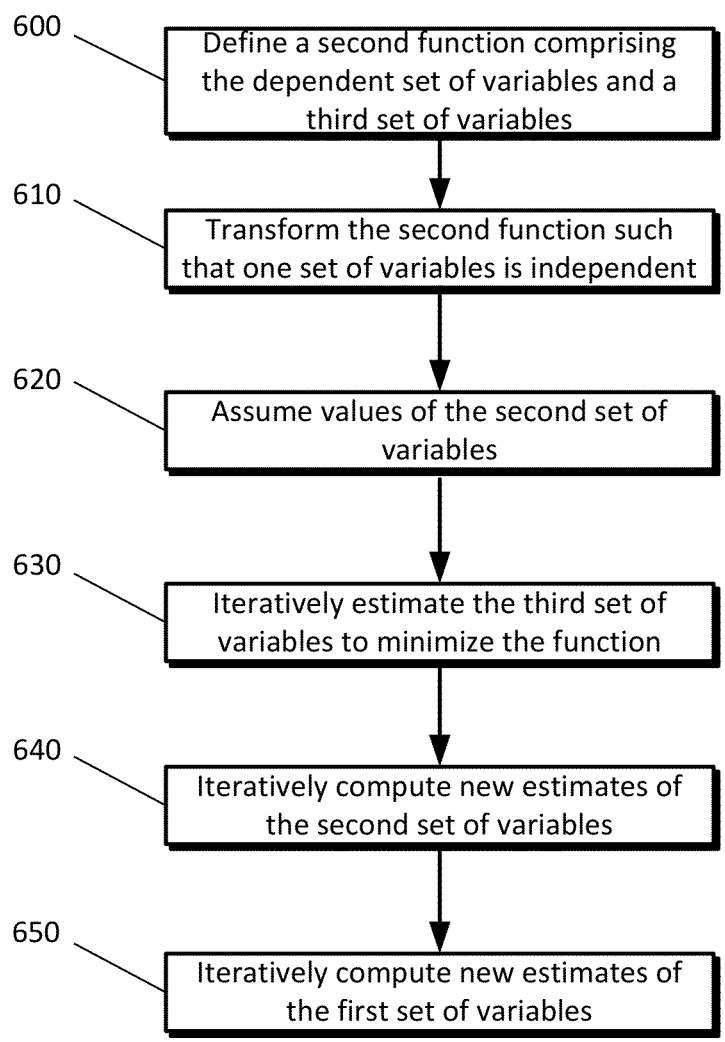
FIG. 6 shows an example process for nested Wiberg minimization according to an embodiment of the disclosed subject matter.

Another embodiment of the disclosed subject matter comprises a $L_1$-Wiberg bundle adjustment, shown in FIG. 5, where at least one camera feature or calibration is known or no feature is known at 530. A plurality of images may be received from a camera at 500. The plurality of images may comprise a sequence where the sequence may be, for example, chronologically determined or position- or location-based. One or more two-dimensional features may be identified in each of a plurality of images in the received sequence of images at 510. A three-dimensional point may be received with each of the identified one or more two-dimensional features. Each of the one or more two-dimensional features may be tracked at 520 through successive images in the plurality of images. At 540 a two-dimensional image error may be iteratively minimized between the tracked each of the one or more two-dimensional features and an image reprojection with respect to the three-dimensional point corresponding to the one or more two-dimensional features and a three-dimensional position of the camera corresponding to one or more of the plurality of images at 550. The camera may have no known features or at least one known feature. Examples of camera features may include focal length, image center, and radial distortion. The determination of the camera's position may be performed using general Wiberg minimization or nested Wiberg minimization. An $L_1$ norm of the image error may be minimized with respect to each of the at least one known feature simultaneously using successive linear programming. An $L_1$ norm of the image error may be minimized with respect to each of the one or more unknowns simultaneously using successive linear programming.

First, a technical description of $L_1$-Wiberg bundle adjustment, where at least one camera feature is known, will be provided. Given the two-dimensional observations of three-dimensional points in an image collection, bundle adjustment may estimate the three-dimensional position of the each point and the six-degree-of-freedom position (rotation and translation) of the camera for each image. The $L_1$-Wiberg bundle adjustment disclosed herein handles nonlinearities (e.g., perspective projection and rotations parameterized by Euler angles) and missing observations easily.

Suppose an observation consists of point $c_i$ at location $x_i$ in image $r_i$, for $i=1, \ldots, n$. Reprojections or predictions given estimates of the camera and point positions may be determined by:

$$p_i=\pi(R(\rho_{r_i})X_{c_i}+t_{r_i}) \quad \text{(Equation 29)}$$

$X_{c_i}$ is the three-dimensional point position. $\rho_{r_i}$, $R(\rho_{r_i})$, and $t_{r_i}$ are the rotation Euler angles, rotation matrix, and translation giving the six-degree-of-freedom camera position (specifically, the world-to-camera transformation) for image $r_i$ respectively. $\pi$ is the perspective projection. The error vector may be described by:

$$\text{error}(\rho,t,X)=[x_1-p_1 \ldots x_n-p_n]^T \quad \text{(Equation 30)}$$

and minimized by computing:

$$\min_{\rho,t,X} \|\text{error}(\rho, t, X)\|_1 \quad \text{(Equation 31)}$$

To implement bundle adjustment as a general Wiberg minimization, a minimization with respect to the cameras in the outer loop and the individual points $X_{c_i}$ in inner loops may be determined.

As with matrix factorization, all of the unknowns may be estimated simultaneously using iterative $L_1$ minimization directly. The method of general Wiberg minimization disclosed herein operates by solving for V iteratively rather than in closed form. In another embodiment, because V is solved iteratively, it may be split into two sets of variables found using the Wiberg approach. This results in a nested Wiberg minimization that can effectively minimize with respect to three sets of variables. Those skilled in the art will recognize that theoretically n sets of variables may be minimized with further nesting.

In general, a nested Wiberg minimization may be performed by having a second set of variables V defined in terms of a third set of variables D and a second function ƒ(V, D) to be minimized may be defined that is nonlinear in both a second set of variables V and the third set of variables D 600. The second function ƒ(V, D) may be transformed at 610 into ƒ(V, D(V)) such that the members of the second set of variables V may be independent variables and the members of the third set of variables D may be dependent on the second set of variables V and that the first function is now represented by ƒ(U, V(U), D(V, U)). Second assumed values of the second set of variables V may be assigned at 620. The third set of variables D may be iteratively estimated at 630 based upon the transformed second function ƒ(V, D(V)) and the second assumed values of the second set of variables V, such that ƒ(V, D(V)) may be minimized with respect to D. At 640 new estimates of the second set of variables V may be iteratively computed to minimize the transformed second function ƒ(V, D(V)) based upon the assumed values of the second set of variables V, the calculated values of the third set of variables D, a derivative of the third set of variables D with respect to the second set of variables V, and a total derivative of the transformed second function ƒ(V, D(V)) with respect to the members of the second set of variables V. At 650 new estimates of the first set of variables U may be iteratively computed to maximize the transformed first function ƒ(U, V(U), D(V, U)) based upon the assumed values of the first set of variables U, the calculated values of the second set of variables V, the calculated values of the third set of variables D, the derivative of D with respect to V, the derivative of D with respect to U, and the derivative of V with respect to U, and the total derivative of the transformed first function ƒ(U, V(U), D(V, U)) with respect to the first set of variables U.

For example, suppose there are three sets of variables U, V, and D and that given U and V a minimization is performed with respect to D in closed form. Further, given U, a minimization is performed with respect to V in an inner iteration and with respect to U in an outer iteration. The total derivative of predictions p with respect to U may be utilized to minimize with respect to U using the nonlinear $L_1$ minimization by computing:

$$\frac{dp}{dU} = \frac{\partial p}{\partial U} + \left(\frac{\partial p}{\partial V} + \frac{\partial p}{\partial D}\frac{dD}{dV}\right)\frac{dV}{dU} + \frac{\partial P}{\partial D}\frac{dD}{dU} \quad \text{(Equation 32)}$$

Equation 26 is the total derivative of p with respect to U, with V a function of U. Similarly, Equation 32 is the total derivative of p with respect to U, but with both V and D a function of U. The expression in parentheses, which is the total derivative of p with respect to V, with D a function of V reflects the nesting.

The $L_1$-Wiberg bundle adjustment disclosed above applies when the camera features or calibration (focal length, image center, radial distortion) is known. In another embodiment, a projective bundle adjustment may be used to recover structure and motion from uncalibrated image sequences as shown in FIG. 5. A projective reconstruction may include 3×4 camera projection matrices and 4-dimensional projective points that are consistent with the image observations and are known up to a common 4×4 transformation. This transformation may be identified, and the projective reconstruction upgraded to a Euclidean reconstruction, given some knowledge of the scene geometry or camera intrinsics.

For example, if point $c_1$ at location $x_1=[x\ y\ 1]^T$ in image $r_i$, for i=1,…, n is observed, then the reprojections (predictions) given estimates of the projection matrices and points may be expressed as:

$$p_i=d_{r_i,c_i}C_{r_i}X_{c_i} \quad \text{(Equation 33)}$$

where $p_i$ is a 3-dimensional projective vector and $d_{r_i,c_i}$ is the inverse projective depth for observation $p_i$, a scalar. The error may be determined by:

$$\text{error}(C,X,d)=[x_1-p_1 \ldots x_n-p_n]^T \quad \text{(Equation 34)}$$

and the minimization may be determined by:

$$\min_{C,X,d} \|\text{error}(C, X, d)\|_1 \quad \text{(Equation 35)}$$

The unknowns may be estimated using nested Wiberg minimization at 560. In this example, each inverse depth may be determined independently given point and projection matrix estimates, in closed form. Each projection matrix given point estimates may be determined using an inner Wiberg minimization, letting the inverse depths vary implicitly. The points in an outer Wiberg minimization may be determined by allowing the projection matrices and inverse depths vary implicitly.

Given point and projection matrix estimates, a "read off" of the projective depths as the last element of CX may be performed rather than estimating them as is known in the art. The inverse depths are explicitly estimated as an example of a nested Wiberg minimization.

As with factorization and Euclidean bundle adjustment, projective bundle adjustment may also be performed by minimizing with respect to all of the unknowns simultaneously, using the nonlinear $L_1$ minimization described earlier 570.

Figure 7:
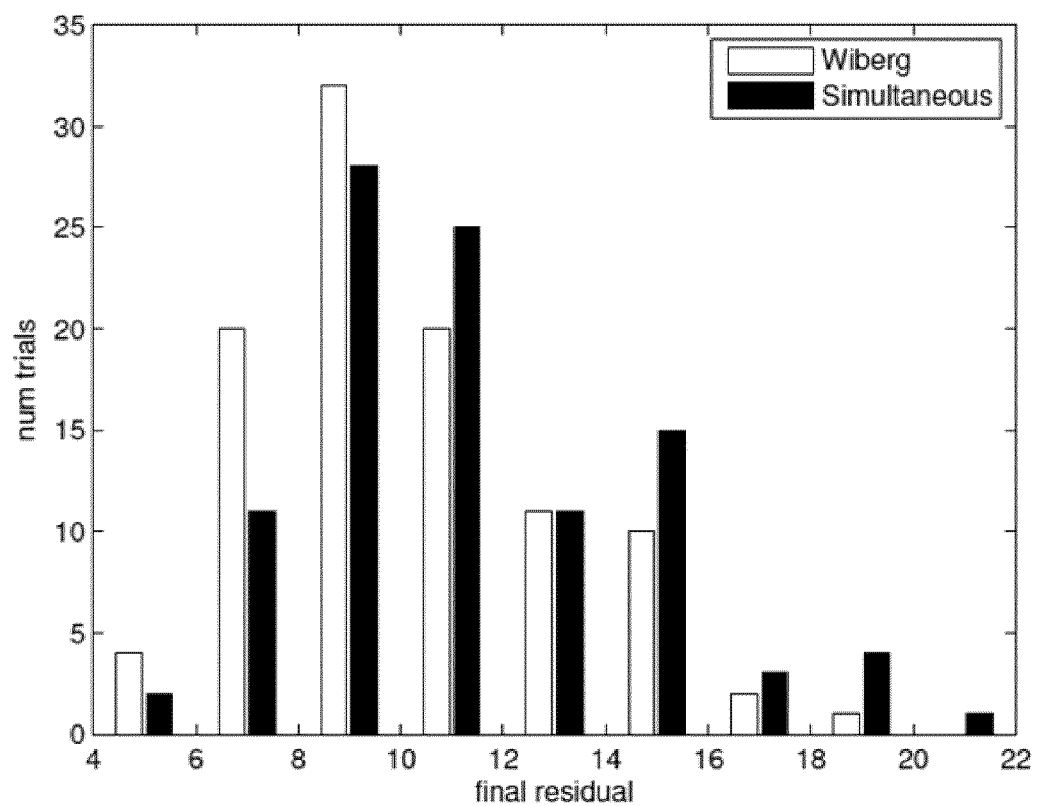
FIG. 7 is a histogram of the final residuals for the 100 synthetic measurement matrices for the Wiberg technique and for the technique disclosed in accordance with an embodiment of the disclosed subject matter.
Figure 8:
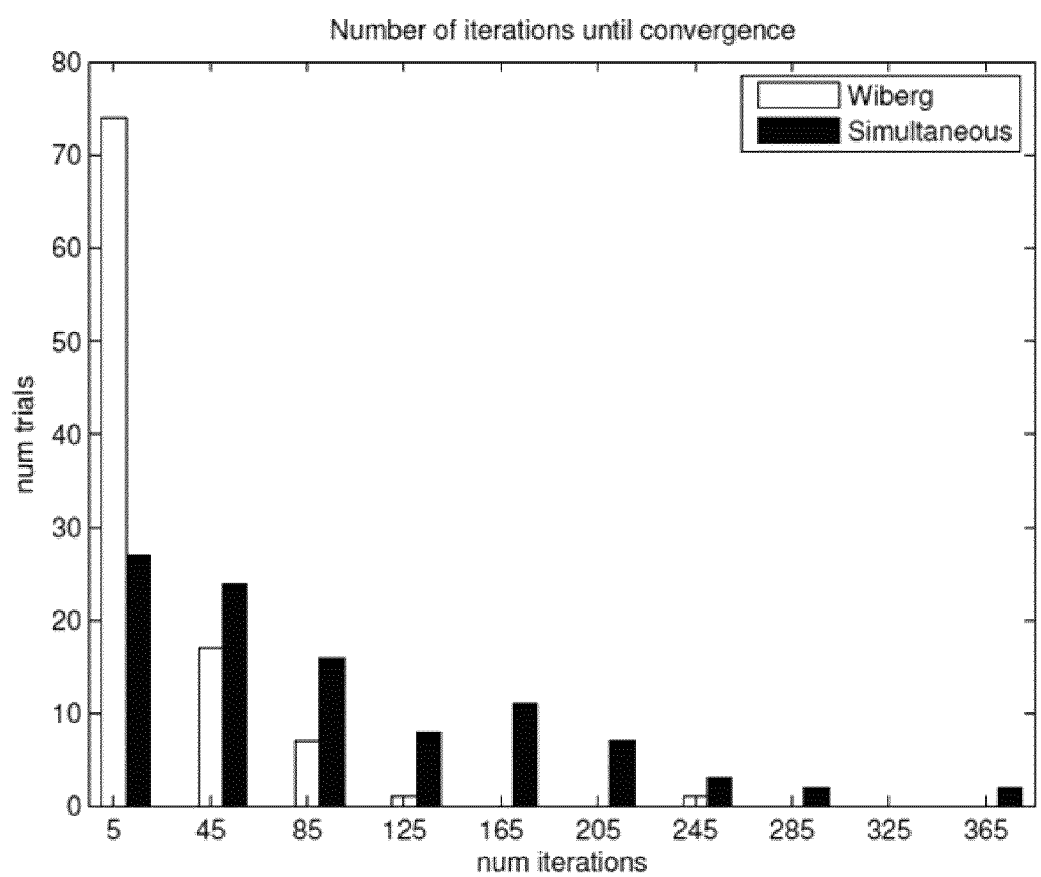
FIG. 8 is a histogram of the number of iterations until convergence, for the Wiberg technique and for the technique disclosed in accordance with an embodiment of the disclosed subject matter.
Figure 9:
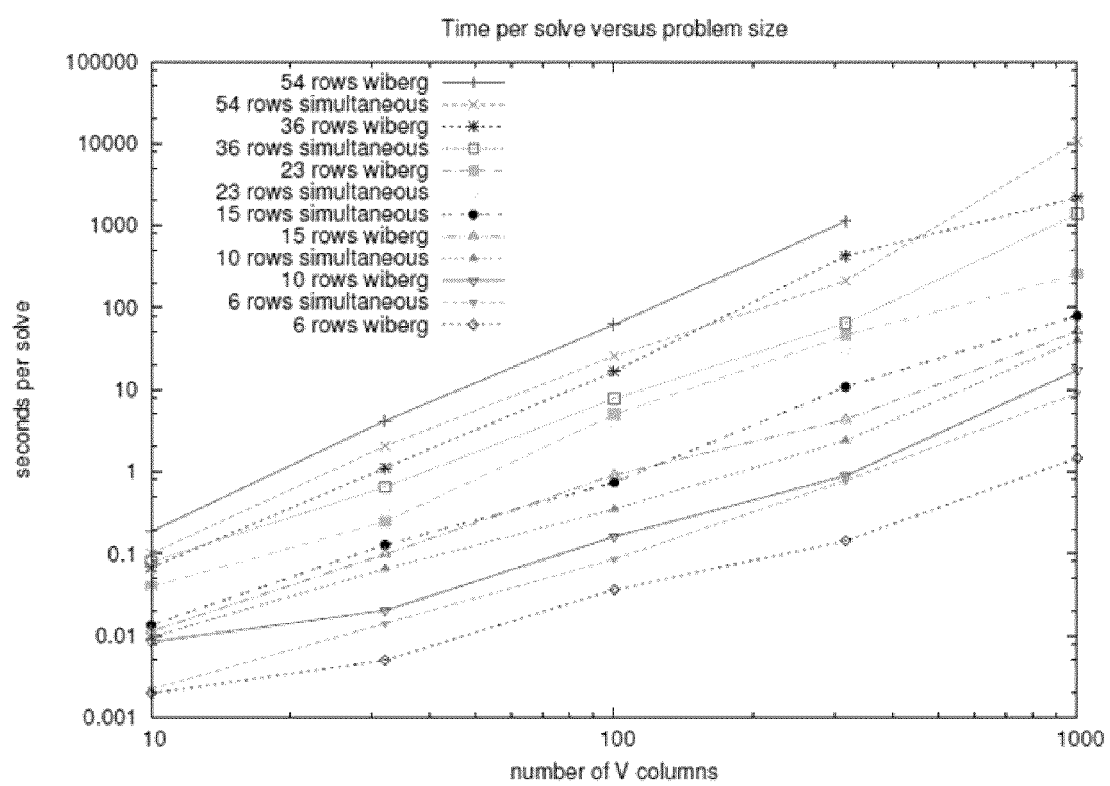
FIG. 9 is a graph showing the time for the linear programming method in one step of factorization as a function of problem size. Different curves give the times for different "number of rows in U", for both Wiberg and for the technique in accordance with an embodiment of the disclosed subject matter. Both axes are logarithmic.

FIGS. 7-9 were generated to provide a comparison of the method of $L_1$-Wiberg factorization used previously and the method disclosed herein. Following previously a described experiment, a 100 7×12 random measurement matrices Y were generated, with elements drawn from [−1,1]. 20% of the elements were marked as missing. 10% of Y's entries were selected as outliers and added noise drawn from [−5,5] to them. U and V were initialized randomly with elements in [−1,1], and both the Wiberg and simultaneous method were applied to them. For each trial, the Wiberg and simultaneous method obtain the exact same input and have the same initial residual. Both methods were executed for 400 iterations which is more than is necessary for convergence.

FIG. 7 shows a histogram of the final residual for each method. As shown in the figure, the Wiberg method tended to produce lower final residuals, though the residuals from the two methods were comparable. Out of the 100 trials, the final residual achieved by Wiberg was better than the simultaneous method by 5% in 57 trials. The simultaneous method was better than Wiberg by 5% in 17 trials. The residuals for both methods were within 5% in the remaining 26 trials.

Each method was executed for 400 iterations and the number of steps until convergence is shown in FIG. 8. For the purposes of this graph, the method converged when it was within a negligible difference (0.1) versus final residual achieved after the 400 iterations. The Wiberg method required fewer iterations, converging in 20 or fewer iterations in over half of the trials. The Wiberg method converged in fewer steps in 83 trials compared to 16 trials for the simultaneous method. Both method converged equally well in 1 trial.

In these small scale examples, the linear programming solve time for the main update step was 1.1 ms for the Wiberg step and 3.1 ms for the simultaneous method step. However, for larger problems, the linear programming time increases quickly, as shown in FIG. 9. This figure plots the time for the linear programming solve for one U update, for different problem sizes, for both the Wiberg and simultaneous approaches. The horizontal axis gives the number of columns in V and the vertical axis gives the time in seconds. The separate plots give the times for different numbers of rows in U. Both axes are on a logarithmic scale. The graph in FIG. 9 shows that Wiberg is faster than simultaneous if U has few rows, and simultaneous is faster otherwise.

Next, the Wiberg approach is compared to the simultaneous bundle adjustment for the ability to recover structure and motion from a real image sequence. For example, structure from motion may be obtained from a synthesized data set comprising three-dimensional points uniformly distributed on a sphere and the camera moving in a ring around it, looking toward the center in each image. 300 instances of this problem were created, varying the following: the number of images (2, 3, 5, 7, 11, 18); the number of points (10, 32, 100, 316, 1000); and the error in the initial estimates of the camera rotation Euler angles, camera translation, and three-dimensional point positions. The errors in the initial estimates were drawn from [−$\epsilon$, $\epsilon$], for $\epsilon$ in {0.01, 0.0215, 0.0464, 0.1, 0.215, 0.464, 1, 2.154, 4.641, 10}.

In almost all cases the two methods converged to zero error, despite the high errors in the initial estimates, within 25 iterations and often just a few iterations. The major difference was in the time required per step, which is summarized in FIGS. 10 and 11. For small numbers of images, the Wiberg method is much faster than the simultaneous method. For large numbers of images, the simultaneous method is faster than the Wiberg method. The crossover is between 4 and 5 images.

Figure 12:
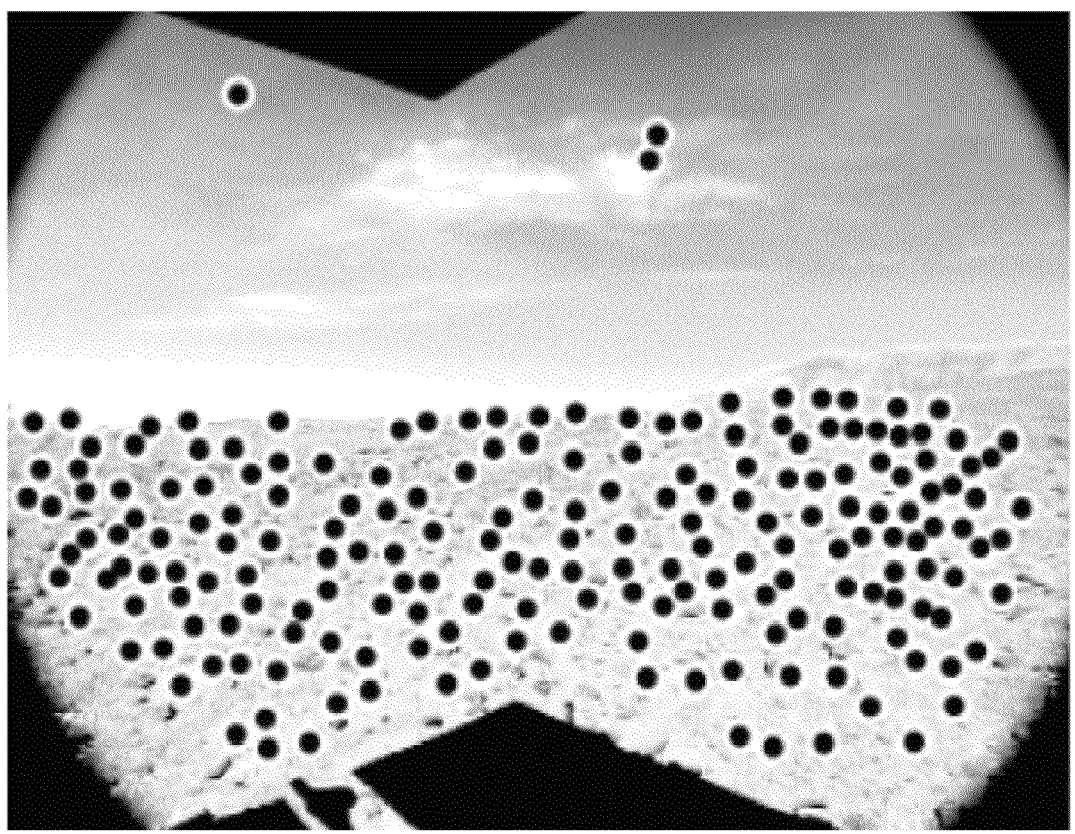
FIG. 12 displays an example image from the "rover" sequence, with tracked points shown as black dots.
Figure 13:
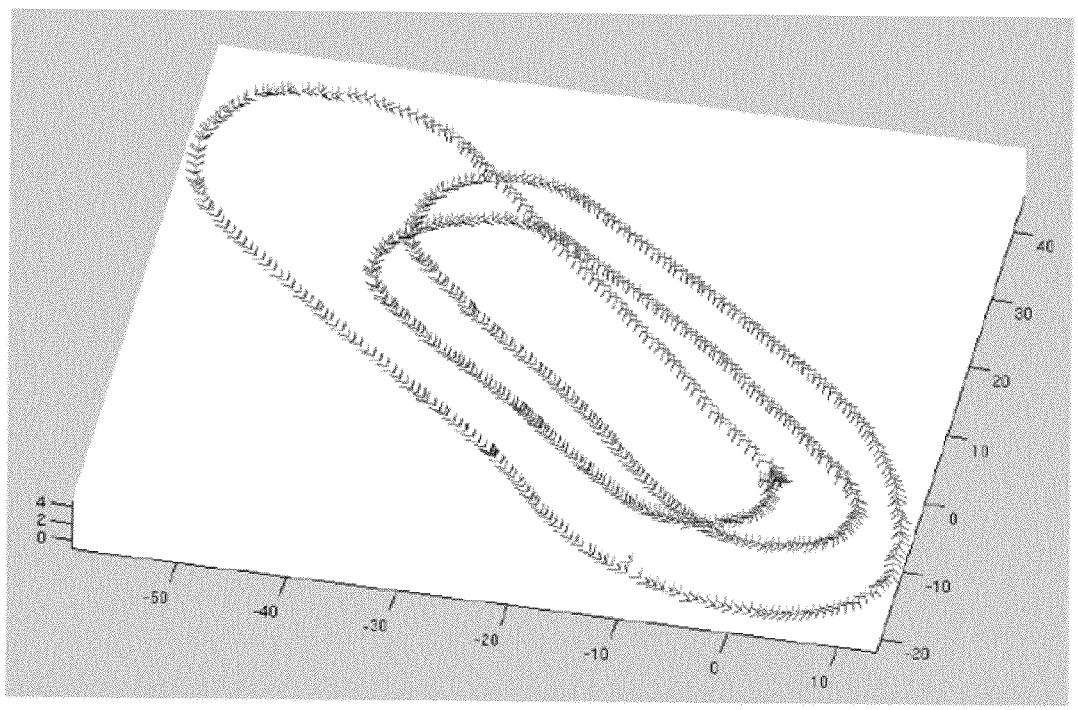
FIG. 13 is an oblique view of the camera motion recovered by the $L_1$-Wiberg bundle adjustment for the "rover" sequence.

FIG. 12 shows an example image from the "rover" sequence, with tracked points shown as black dots. The camera looks out from the back of a rover while the rover executes three large loops. The sequence includes about 700 images and about 10,000 three-dimensional points. The Wiberg bundle adjustment correctly recovers the structure and motion, and the estimated motion is shown in FIG. 13. The result is locally correct and consistent with the global motion estimates from GPS and odometry. Factorization and affine structure-from-motion cannot recover the camera position because perspective effects are extremely strong due to the large difference in distance to the near and far points.

The convergence and speed of the Wiberg and simultaneous projective bundle adjustment methods were compared using a synthetic data set comprising 300 instances of the problem, varying the number of images (10, 14, 19, 26, 36, 50); the number of points (10, 15, 22, 33, 50); and the error in the initial estimates (10 values exponentially spaced between 0.001 and 0.1).

Figure 10:
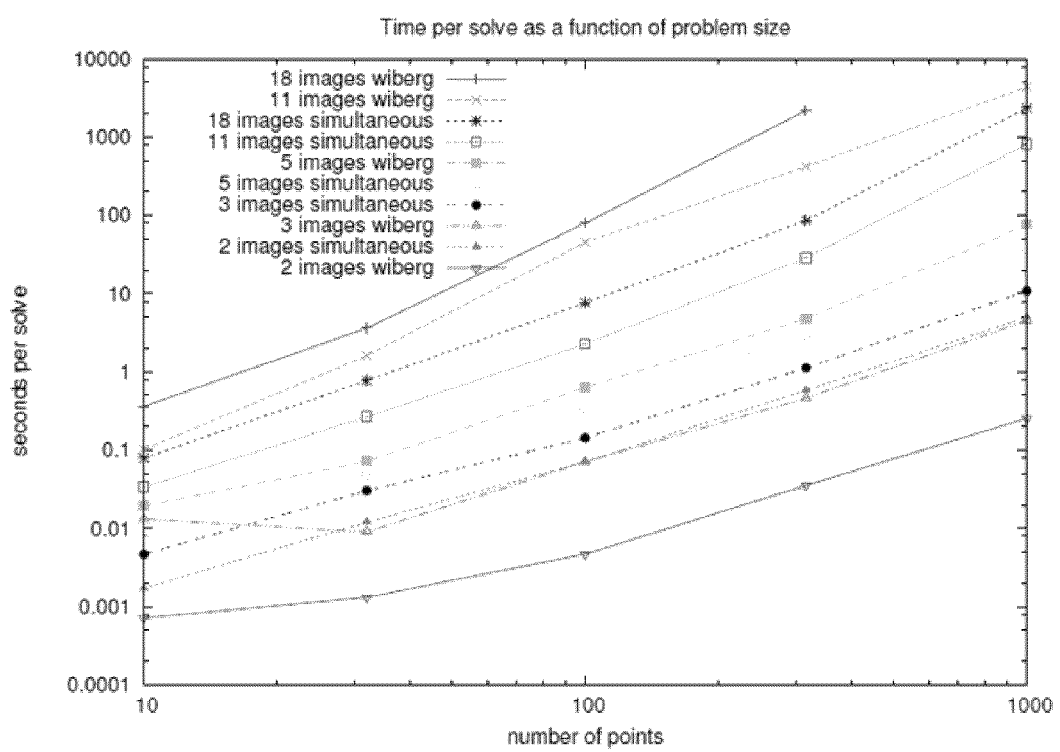
FIG. 10 is a graph with the time in seconds for the linear programming method in one step of bundle adjustment as a function of the number of images and points. Both axes are on a logarithmic scale.
Figure 11:
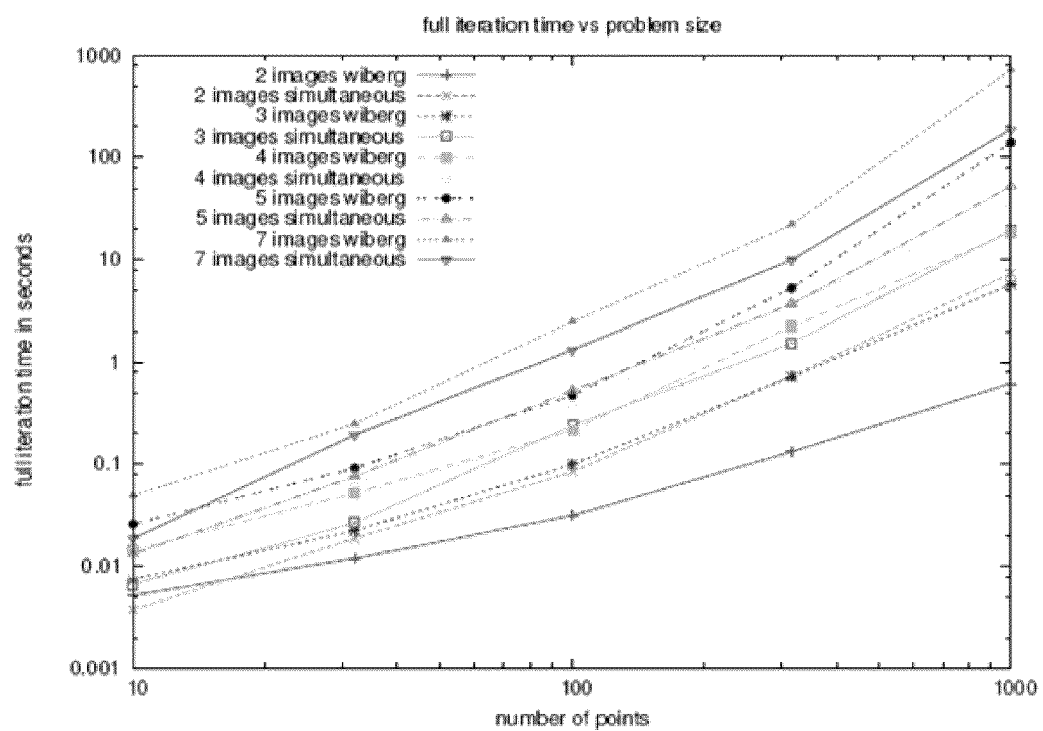
FIG. 11 is a graph with the time in seconds for the full step of bundle adjustment, as a function of the number of images and points. Both axes are on a logarithmic scale.
Figure 14:
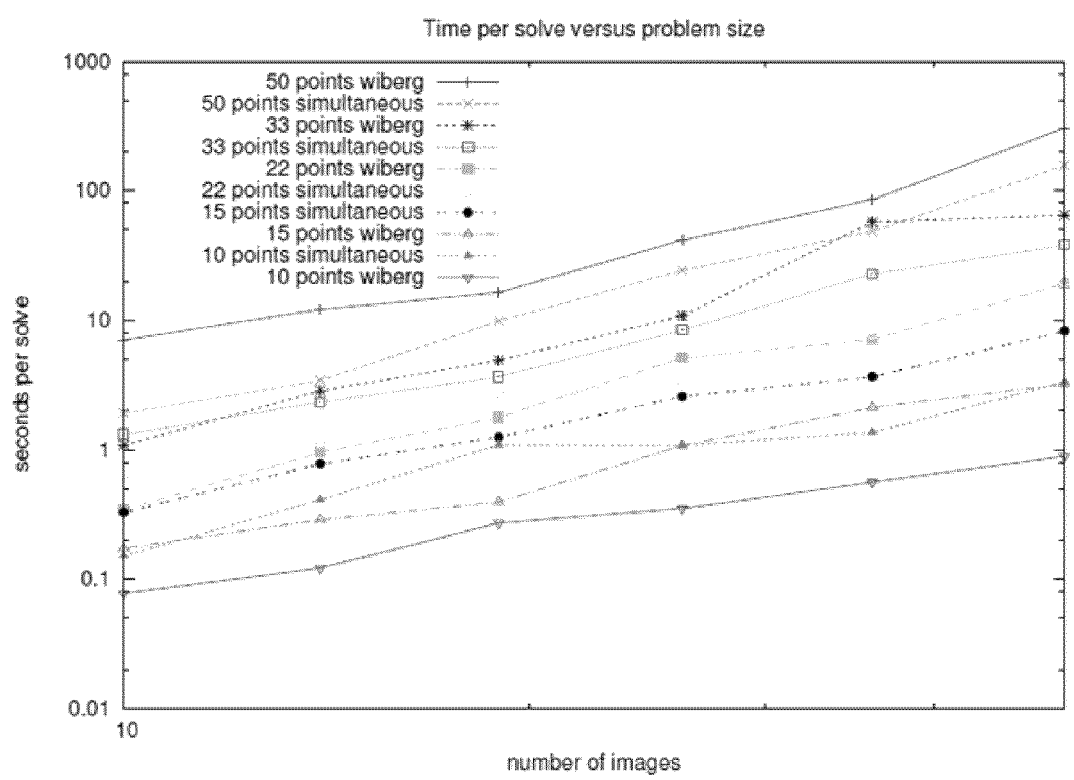
FIG. 14 is a graph showing the time in seconds for the linear programming method in one step of projective bundle adjustment, as a function of the number of images and points. Both axes are on a logarithmic scale.

FIG. 14 is analogous to FIGS. 9 and 10, and shows the time per outer linear programing solve as a function of the problem size. Point positions were determined rather than camera positions in the outer loop. The observed trend was the same as described earlier. The Wiberg step was faster for smaller numbers of points and the simultaneous method was faster for larger numbers of points. The crossover was around 22 points.

The Wiberg method had somewhat better convergence than the simultaneous method when started from the same estimates. Out of the 300 problems, both converged to zero residual in 232 cases (those with the smaller errors). For the larger errors, the Wiberg method converged to a smaller residual in 57 cases and the simultaneous method converged to a smaller residual in 2 cases.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method for determining a camera position in a plurality of images captures by the camera comprising:

defining a first function $f(U, V)$ that is nonlinear in both a first set of variables U and a second set of variables V, wherein the first set of variables U correspond to a first feature of the plurality of images and the second set of variables V correspond to a second features of the plurality of images;

transforming, by a processor, the first function $f(U, V)$ into $f(U, V(U))$ such that the members of the first set of variables U are independent variables and the members of the second set of variables V are dependent on the first set of variables;

assigning first assumed values of the first set of variables U;

iteratively estimating, by the processor, the second set of variables V based upon the transformed first function $f(U, V(U))$ and the assumed values of the first set of variables U such that $f(U, V(U))$ is minimized with respect to V; and determining the camera position by iteratively computing new estimates of the first set of variables U to minimize the transformed first function $f(U, V(U))$ based upon the assumed values of the first set of variables U and the calculated values of the second set of variables V and a derivative of the second set of variables V with respect to the first set of variables U and a total derivative of the transformed first function $f(U, V(U))$ with respect to the members of the first set of variables U.

2. The method of claim 1, further comprising:

defining a set of variables $U_1, \ldots, U_n$;

transforming the first function $f(U, V)$ into $f(U_1, V(U_1))$, $(U_2, V(U_1)), \ldots, f(U_n, V(U_{n-1})), (U_{n+1}, V(U_n))$; and minimizing with respect to $U_n$.

3. The method of claim 1, wherein the minimizing the transformed first function $f(U, V(U))$ based upon the assumed values of the first set of variables U comprises minimizing $L_1$ error.

4. The method of claim 3, wherein the $L_1$ error is minimized using successive linear programming.

5. The method of claim 1, wherein the minimizing the transformed first function $f(U, V(U))$ based upon the assumed values of the first set of variables U comprises minimizing $L_2$ error.

6. The method of claim 5, wherein the $L_2$ error is minimized using the Gauss-Newton method.

7. The method of claim 1, wherein the minimizing the transformed first function $f(U, V(U))$ based upon the assumed values of the first set of variables U comprises a maximum likelihood estimation.

8. The method of claim 7, wherein the maximum likelihood estimation is determined by the Newton-Raphson method.

9. The method of claim 1, further comprising:

defining the second set of variables V in terms of a third set of variables D;

defining a second function $f(V, D)$ to be minimized, that is nonlinear in both a second set of variables V and the third set of variables D;

transforming the second function $f(V, D)$ into $f(V, D(V))$ such that the members of the second set of variables V are independent variables and the members of the third set of variables D are dependent on the second set of variables V and that the first function is now represented by $f(U, V(U), D(V, U))$;

assigning second assumed values of the second set of variables V;

iteratively estimating the third set of variables D based upon the transformed second function $f(V, D(V))$ and the second assumed values of the second set of variables V, such that $f(V, D(V))$ is minimized with respect to D;

iteratively computing new estimates of the second set of variables V to minimize the transformed second function $f(V, D(V))$ based upon the assumed values of the second set of variables V and the calculated values of the third set of variables D and a derivative of the third set of variables D with respect to the second set of variables V and a total derivative of the transformed second function $f(V, D(V))$ with respect to the members of the second set of variables V; and iteratively computing new estimates of the first set of variables U to maximize the transformed first function $f(U, V(U), D(V, U))$ based upon the assumed values of the first set of variables U and the calculated values of the second set of variables V and the calculated values of the third set of variables D, the derivative of D with respect to V, the derivative of D with respect to U, and the derivative of V with respect to U, and the total derivative of the transformed first function $f(U, V(U), D(V, U))$ with respect to the first set of variables U.

10. The method of claim 1, wherein $f(U, V(U))$ is minimized with respect to a subset of the variables in U on each iteration, selecting a different subset of U on each iteration.

11. The method of claim 1, wherein the derivatives are computed using finite differences.

* * * * *